US012745706B2

(12) United States Patent
Farley et al.

(10) Patent No.: US 12,745,706 B2
(45) Date of Patent: Sep. 29, 2026

(54) SYSTEM AND METHOD FOR ADJUSTING GAINS FOR POSITION CONTROL OF A HEADER OF AN AGRICULTURAL HARVESTER

(71) Applicant: CNH Industrial America LLC, New Holland, PA (US)

(72) Inventors: Herbert Max Farley, Elizabethtown, PA (US); Cory Douglas Hunt, Millersville, PA (US); Jethro Martin, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 415 days.

(21) Appl. No.: 18/233,150

(22) Filed: Aug. 11, 2023

(65) Prior Publication Data

US 2025/0048964 A1 Feb. 13, 2025

(51) Int. Cl.
*A01D 41/14* (2006.01)
*A01D 41/06* (2006.01)

(52) U.S. Cl.
CPC ........... *A01D 41/141* (2013.01); *A01D 41/06* (2013.01); *A01D 41/145* (2013.01)

(58) Field of Classification Search
CPC ..... A01D 41/141; A01D 41/06; A01D 41/145
See application file for complete search history.

(56) References Cited

U.S. PATENT DOCUMENTS

2017/0245434 A1* 8/2017 Jung .................... A01B 63/008
2018/0271016 A1 9/2018 Milano et al.
2020/0000034 A1 1/2020 Schlipf
2021/0051850 A1 2/2021 Seiders, Jr.
2022/0110262 A1* 4/2022 Vandike ............... G05D 1/0221

FOREIGN PATENT DOCUMENTS

CN 113298670 A * 8/2021 ............. G05D 1/021
DE 102021124212 A1 4/2022
EP 3569049 A1 11/2019

OTHER PUBLICATIONS

Extended European Search Report for Application No. EP 24193647.5, mailed Dec. 23, 2024, 11 pages.
Communication pursuant to Article 94(3) EPC for European Pat. App. No. 24193647.5, dated Feb. 10, 2026, 8 pages.

* cited by examiner

*Primary Examiner* — Luke Huynh
(74) *Attorney, Agent, or Firm* — Dority & Manning, P.A.

(57) ABSTRACT

A system for adjusting gains for position control of a header of an agricultural harvester includes a header of an agricultural harvester, an actuator configured to adjust a position of the header relative to a field, and a computing system communicatively coupled to the actuator. The computing system is configured to receive data indicative of a contour of the field forward of the agricultural harvester relative to a forward direction of travel of the agricultural harvester. The computing system is further configured to determine an aggressiveness of the contour of the field based at least in part on the data indicative of the contour of the field. Additionally, the computing system is configured to adjust a gain for controlling the actuator based at least in part on the aggressiveness of the contour of the field.

18 Claims, 3 Drawing Sheets

SYSTEM AND METHOD FOR ADJUSTING GAINS FOR POSITION CONTROL OF A HEADER OF AN AGRICULTURAL HARVESTER

FIELD OF THE INVENTION

The present disclosure relates generally to agricultural harvesters and, more particularly, to systems and methods for adjusting gains for position control of a header of an agricultural harvester.

BACKGROUND OF THE INVENTION

A harvester is an agricultural machine that is used to harvest and process crops. For instance, a forage harvester may be used to cut and comminute silage crops, such as grass and corn. Similarly, a combine harvester may be used to harvest grain crops, such as wheat, oats, rye, barley, com, soybeans, and flax or linseed. In general, the objective is to complete several processes, which traditionally were distinct, in one pass of the machine over a particular part of the field. In this regard, most harvesters are equipped with a detachable harvesting implement, such as a header, which cuts and collects the crop from the field and feeds it to the base harvester for further processing. The harvester also includes a crop processing system, which performs various processing operations (e.g., threshing, separating, cleaning, etc.) of the harvested crop received from the harvesting implement.

In some instances, the position of the header may be manually controlled to try to maintain a particular distance above the ground. However, in more varied terrain, more frequent adjustments may be needed which can cause strain on an operator. Further, an operator may not be able to respond quickly enough to changes in terrain, which may cause losses due to improper header positioning. Additionally, the gain or speed at which an actuator may be controlled to adjust the header positioning is typically not changed during a harvesting operation. As such, the gain may be higher than necessary in areas of the field with more gradual changes in contour, which may cause excessive vibrations for an operator and be generally less efficient. Conversely, the gain may be lower than necessary in areas of the field with more sudden or aggressive changes in contour, which may cause losses due to improper header positioning.

Accordingly, systems and methods for adjusting gains for position control of a header of an agricultural harvester would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for adjusting gains for position control of a header of an agricultural harvester. For instance, the system may include a header of an agricultural harvester, an actuator configured to adjust a position of the header relative to a field, and a computing system communicatively coupled to the actuator. The computing system may be configured to receive data indicative of a contour of the field forward of the agricultural harvester relative to a forward direction of travel of the agricultural harvester. The computing system may further be configured to determine an aggressiveness of the contour of the field based at least in part on the data indicative of the contour of the field. Additionally, the computing system may be configured to adjust a gain for controlling the actuator based at least in part on the aggressiveness of the contour of the field.

In another aspect, the present subject matter is directed to a method for adjusting gains for position control of a header of an agricultural harvester. For instance, the method may include controlling, with a computing system, an actuator to adjust a position of the header relative to a field during a harvesting operation. The method may further include receiving, with the computing system, data indicative of a contour of the field forward of the agricultural harvester relative to a forward direction of travel of the agricultural harvester. Moreover, the method may include determining, with the computing system, an aggressiveness of the contour of the field based at least in part on the data indicative of the contour of the field. Additionally, the method may include adjusting, with the computing system, a gain for controlling the actuator based at least in part on the aggressiveness of the contour of the field.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
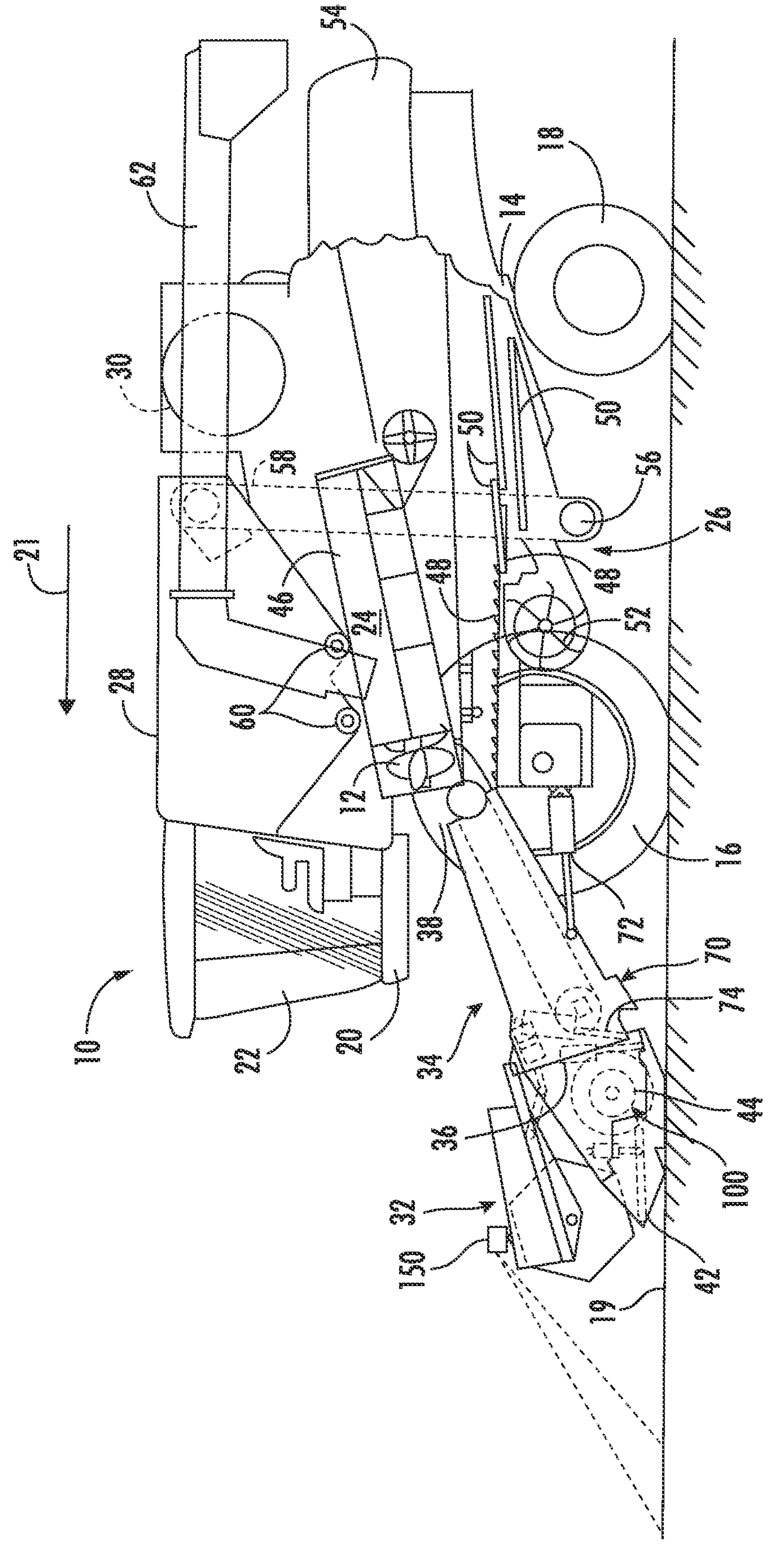
FIG. 1 illustrates a simplified, partial sectional side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a harvested material within a fluid circuit. For example, "upstream" refers to the direction from which a harvested material flows, and "downstream" refers to the direction to which the harvested material moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein will be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone: B alone: C alone: A and B in combination: A and C in combination: B and C in combination: or A, B, and C in combination.

In general, the present subject matter is directed to systems and methods for adjusting gains for position control of a header of an agricultural harvester. Typically, the position of the header may be manually controlled to try to maintain a particular distance above the ground. However, in more varied terrain, more frequent adjustments may be needed which can cause strain on an operator. Further, an operator may not be able to respond quickly enough to changes in terrain, which may cause losses due to improper header positioning. Additionally, the gain or speed at which an actuator may be controlled to adjust the header positioning is typically not changed during a harvesting operation. As such, the gain may be higher than necessary in areas of the field with more gradual changes in contour, which may cause excessive vibrations for an operator and be generally less efficient. Conversely, the gain may be lower than necessary in areas of the field with more sudden or aggressive changes in contour, which may cause losses due to improper header positioning.

Thus, in accordance with aspects of the present subject matter, a computing system may be configured to receive data indicative of a contour of the field in which an agricultural operation is being performed, or about to be performed, with an agricultural harvester. In some instances, the data may be received from a sensor on the agricultural harvester directed generally towards a portion of the field that has not yet been operated on by the agricultural harvester. In other instances, the data may additionally, or alternatively, be historical data generated during previous agricultural operations (e.g., tilling, planting, etc.) or other passes within the field. Based on the data indicative of the contour of the field, the computing system may be configured to determine an aggressiveness of the contour of the field, which is generally indicative of the rate of change of the contour of the field (e.g., if there are steep inclines, gentle slopes, bumps, etc.). Based on the aggressiveness of the contour of the field, the computing system may be configured to adjust a gain or sensitivity for controlling an actuator for adjusting the position of the header relative to the field. For instance, if the aggressiveness of the contour of the field is high, the computing system may generally be configured to increase the gain (increase the rate or sensitivity for adjusting the header position). Conversely, if the aggressiveness of the contour of the field is low, the computing system may generally be configured to reduce the gain (decrease the rate or sensitivity for adjusting the header position). As such, the position of the header is controllable with a gain that is best suited for the terrain aggressiveness. Such adjustment of gain may be particularly useful for automatic control of the header position by the computing system based on the contour of the field.

Referring now to the drawings, FIG. 1 illustrates a simplified, partial sectional side view of one embodiment of a work vehicle, such as an agricultural harvester 10. The harvester 10 may be configured as an axial-flow type combine, wherein crop material is threshed and separated while it is advanced by and along a longitudinally arranged rotor 12. The harvester 10 may include a chassis or main frame 14 having a pair of driven, ground-engaging front wheels 16 and a pair of steerable rear wheels 18. The wheels 16, 18 may be configured to support the harvester 10 relative to a ground surface 19 and move the harvester 10 in a forward direction of movement (indicated by arrow 21 in FIG. 1) relative to the ground surface 19. Additionally, an operator's platform 20 with an operator's cab 22, a threshing and separating assembly 24, a grain cleaning assembly 26, and a holding tank 28 may be supported by the frame 14. As is generally understood, the harvester 10 may include an engine and a transmission mounted on the frame 14. The transmission may be operably coupled to the engine and may provide variably adjusted gear ratios for transferring engine power to the wheels 16, 18 via a drive axle assembly (or via axles if multiple drive axles are employed).

Moreover, as shown in FIG. 1, a harvesting implement (e.g., a header 32) and an associated feeder 34 may extend forward of the main frame 14 and may be pivotally secured thereto for generally vertical movement. In general, the feeder 34 may be configured to serve as a support structure for the header 32. As shown in FIG. 1, the feeder 34 may extend between a front end 36 coupled to the header 32 and a rear end 38 positioned adjacent to the threshing and separating assembly 24. As is generally understood, the rear end 38 of the feeder 34 may be pivotally coupled to a portion of the harvester 10 to allow the front end 36 of the feeder 34 and, thus, the header 32 to be moved upwardly and downwardly relative to the ground 19 to set the desired harvesting or cutting height for the header 32.

As the harvester 10 is propelled forwardly over a field with standing crop, the crop material is severed from the stubble by a sickle bar 42 at the front of the header 32 and delivered by a material transfer device 44 (e.g., a header auger, a header conveyor, etc.) to the front end 36 of the feeder 34, which supplies the cut crop to the threshing and separating assembly 24. As is generally understood, the threshing and separating assembly 24 may include a cylindrical chamber or concave rotor cage 46 (hereinafter referred to as "concave 46") in which the rotor 12 is rotated by a rotor drive to thresh and separate the crop received therein. That is, the crop is rubbed and beaten between the rotor 12 and the inner surfaces of the concave 46, whereby the grain, seed, or the like, is loosened and separated from the straw or material other than grain (MOG). In some embodiments, a position of the concave 46 about the rotor axis (e.g., a distance from the rotor axis) may be adjustable by one or more first concave actuators and/or an angle of vanes within the concave 46 may be adjustable by one or more second concave actuators.

Crop material which has been separated by the threshing and separating assembly 24 falls onto a series of pans 48 and associated sieves 50, with the separated crop material being spread out via oscillation of the pans 48 and/or sieves 50 and eventually falling through apertures defined in the sieves 50. Additionally, a cleaning fan 52 may be positioned adjacent to one or more of the sieves 50 to provide an air flow through the sieves 50 that removes chaff and other impurities from the crop material. For instance, the fan 52 may blow the impurities off of the crop material for discharge from the harvester 10 through the outlet of a straw hood 54 positioned at the back end of the harvester 10. In some embodiments, a leveling system may be provided for adjusting the lateral positioning of the cleaning assembly 48, 50. For instance, when the agricultural harvester 10 is on a hill such that one lateral side of the agricultural harvester 10 is positioned higher than its other lateral side, one or more actuators of the leveling system may adjust the lateral positioning or angle of the pans 48 and/or the sieves 50 to counteract such sloping and keep the pans 48 and sieves 50 level.

The cleaned crop material passing through the sieves 50 may then fall into a trough of an auger 56, which may be configured to transfer the crop material to an elevator 58 for delivery to the associated holding tank 28. Additionally, a pair of tank augers 60 at the bottom of the holding tank 28 may be used to urge the cleaned crop material sideways to an unloading tube 62 for discharge from the harvester 10.

Moreover, in several embodiments, the harvester 10 may also include a hydraulic system 70 which is configured to adjust a height of the header 32 relative to the ground surface 19 so as to maintain the desired cutting height between the header 32 and the ground surface 19. The hydraulic system 70 may include a height actuator 72 (e.g., a fluid-actuated cylinder) configured to adjust the height or vertical positioning of the header 32 relative to the ground. For example, in some embodiments, the height actuator 72 may be coupled between the feeder 34 and the frame 14 such that the height actuator 72 may pivot the feeder 34 to raise and lower the header 32 relative to the ground 19. In addition, the hydraulic system 70 may include a tilt actuator(s) 74 (e.g., a fluid-actuated cylinder) coupled between the header 32 and the feeder 34 to allow the header 32 to be tilted relative to the ground surface 19 or pivoted laterally or side-to-side relative to the feeder 34.

Additionally, in accordance with aspects of the present subject matter and as will be described in greater detail below, one or more sensors 150 may be configured to generate data indicative of a contour or profile of the field. Generally, the data indicative of the contour of the field may be used to control the position of the header 32. More particularly, the degree of variation in the contour of the field may be used to adjust the gain (sometimes referred to as control sensitivity) for controlling the position of the header 32 (e.g., controlling the operation of the header actuator(s) 72, 74). For instance, if the harvester 10 is going to encounter aggressive terrain with quickly changing elevation, but the current gain setting is too low, the position of the header 32 may not be adjusted quickly enough to account for the changes in elevation, which can lead to harvest losses and/or equipment damage. Conversely, if the harvester 10 is going to encounter relatively smooth terrain with few changes in elevation, but the current gain setting is too high, excessive vibration may be caused when performing header 32 position adjustments, which may be perceived by the operator as a rough ride feel.

In some instances, the sensor(s) 150 may be positioned on the harvester 10, such as on the header 32, the operator's cab 22, or at any other suitable location on the harvester 10. For example, as shown in FIG. 1, the sensor(s) 150 may be positioned on the harvester 10 and have a field of view directed towards the field. For instance, the field of view of the sensor(s) 150 may be directed towards a portion of the field not yet worked by the harvester 10 (e.g., a forward portion of the field forward of the harvester 10 relative to the forward direction of travel 21). However, the sensor(s) 150 may instead or additionally be directed towards any other suitable portion of the field, such as towards a portion already worked by the harvester 10 (e.g., a rearward portion of the field rearward of the harvester 10 relative to the forward direction of travel 21). In one or more embodiments, the sensor(s) 150 may additionally, or alternatively, be provided separately from the agricultural harvester 10. For instance, the sensor(s) 150 may be positioned on another agricultural work vehicle and/or implement configured to perform another agricultural operation (e.g., tilling, planting, and/or the like) within the field, on any other vehicle (e.g., an unmanned aerial vehicle (UAV)) configured to perform any other suitable pass across the field, and/or the like. In some instances, such as when the sensor(s) 150 (e.g., on-board the harvester 10 and/or UAV(s)) have a field of view directed toward a forward portion of the field relative to the harvester 10, the data generated by the sensor(s) 150 may include real-time data, which may provide the most up-to-date indication of the contour of the field. However, in some instances, the data generated by the sensor(s) 150 may additionally, or alternatively, be historical data generated generally prior to the agricultural harvester 10 performing the current harvesting operation, such as during previous passes of the agricultural harvester 10 and/or other vehicle (s)/implement(s) within the field.

The sensor(s) 150 may be configured as any suitable device, such as camera(s) (including stereo camera(s), and/or the like), LIDAR device(s), radar sensor(s), ultrasonic sensor(s), and/or the like, that allows the sensor(s) 150 to generate image data, point-cloud data, radar data, ultrasound data, and/or the like indicative of the contour of the field. In some instances, one or more of the sensor(s) 150 may be configured to generate data indicative of movement of the vehicle/implement to which it is attached (e.g., of the frame 14 of the harvester 10), which may in turn be indicative of contour of the field. For example, the sensor(s) 150 may be configured as an accelerometer(s), a gyroscope(s), and/or the like. Additionally, or alternatively, in some instances, one or more of the sensor(s) 150 may be configured to generate data indicative of movement of an arm coupled to the vehicle/implement to which it is attached (e.g., the harvester 10) and configured to ride along the surface of the field, where movement of the arm relative to the vehicle/implement to which it is attached is indicative of the contour of the field. In such instances, the sensor(s) 150 may be configured as a rotational sensor, a potentiometer, a Hall-effect sensor, and/or any other suitable type of sensor.

Figure 2:
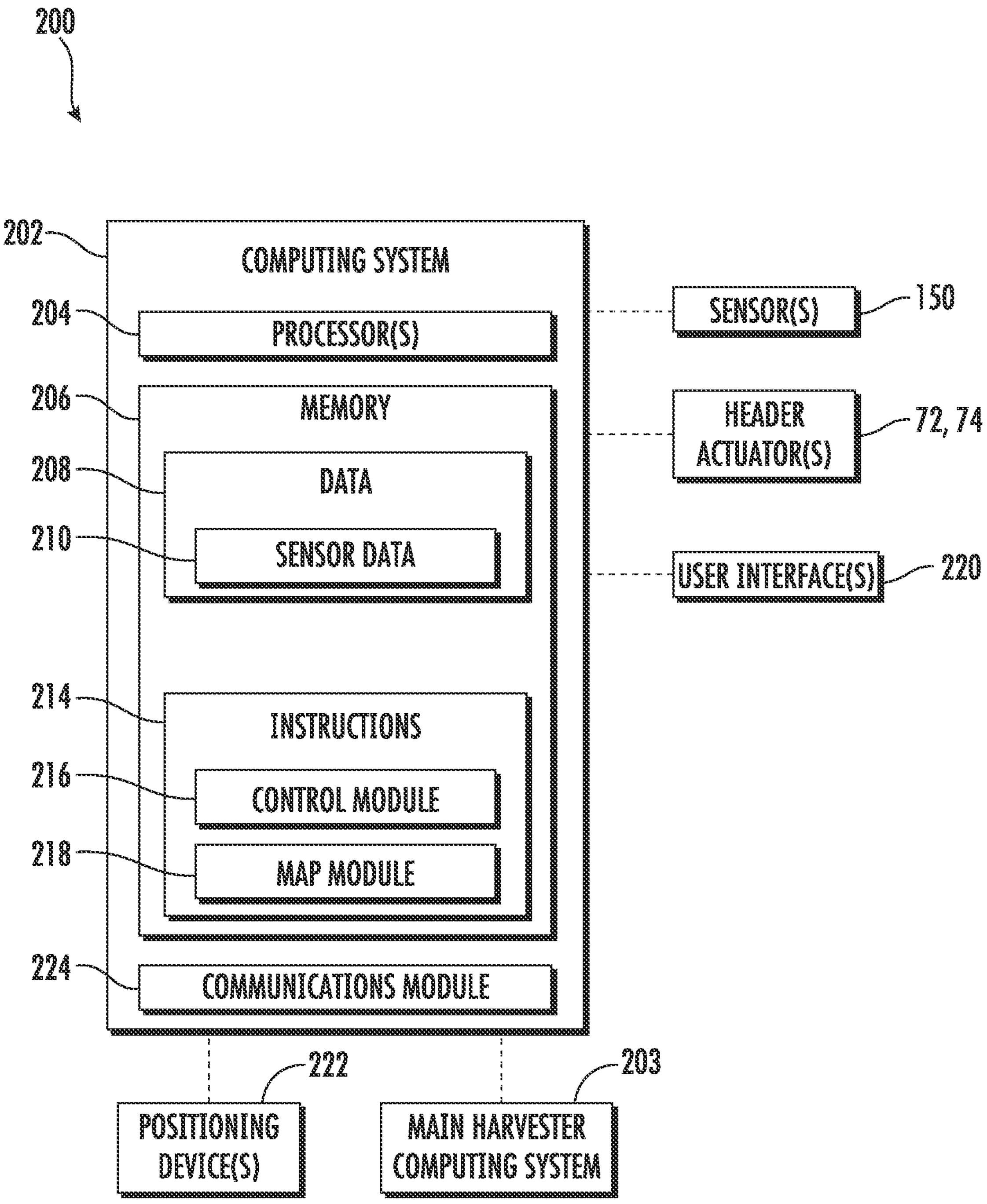
FIG. 2 illustrates a schematic view of a system for adjusting gains for position control of a header of an agricultural harvester in accordance with aspects of the present subject matter.

Turning now to FIG. 2, a schematic view of one embodiment of a control system 200 for adjusting gains for position control of a header of an agricultural harvester is illustrated in accordance with aspects of the present subject matter. In general, the control system 200 will be described herein with reference to the harvester 10 described with reference to FIG. 1. However, it should be appreciated that the disclosed control system 200 may be used with any suitable agricultural work vehicle having any other suitable vehicle configuration.

As shown, the control system 200 may include a computing system 202 and various other components configured to be communicatively coupled to and/or controlled by the computing system 202, such as one or more header actuator(s) (e.g., the header actuator(s) 72, 74) for adjusting the position of the header 32 relative to the frame 14, and thus, the position (height and/or tilt) of the header 32 relative to a field. The system 200 may further include the sensor(s) 150 for generating data indicative of a contour of the field. Moreover, in some instances, the system 200 may include a user interface (e.g., user interface(s) 220). The user interface(s) 220 may include, without limitation, any combination of input and/or output devices that allow an operator to provide operator inputs to the computing system 202 and/or that allow the computing system 202 to provide feedback to the operator, such as a key board, keypad, pointing device, buttons, knobs, touch sensitive screen, mobile device, audio input device, audio output device, and/or the like. Additionally, in some instances, the system 200 may include one or more positioning devices communicatively coupled to the computing system 202 and configured to generate data indicative of the location of the agricultural harvester 10, such as a satellite navigation positioning device (e.g., a GPS system, a Galileo positioning system, a Global Navigation satellite system (GLONASS), a BeiDou Satellite Navigation and Positioning system, a dead reckoning device, and/or the like).

In general, the computing system 202 may correspond to any suitable processor-based device(s), such as a computing device or any combination of computing devices. Thus, as shown in FIG. 2, the computing system 202 may generally include one or more processor(s) 204 and associated memory devices 206 configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 206 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 206 may generally be configured to store information accessible to the processor(s) 204, including data 208 that can be retrieved, manipulated, created and/or stored by the processor(s) 204 and instructions 214 that can be executed by the processor(s) 204.

It should be appreciated that the computing system 202 may correspond to an existing controller for the agricultural harvester 10 or may correspond to a separate processing device. For instance, in one embodiment, the computing system 202 may form all or part of a separate plug-in module that may be installed in operative association with the agricultural harvester 10 to allow for the disclosed system and method to be implemented without requiring additional software to be uploaded onto existing control devices of the agricultural harvester 10.

For instance, in some embodiments, the computing system 202 is a header computing system configured to control operation of the header 32. In such embodiments, the header computing system 202 may be communicatively coupled to a main computing system 203 of the harvester 10 configured to control the operation of the crop processing system, downstream of the header 32, such as the operation of the rotor drive 76, the concave actuator(s) 78A, 78B, the fan(s) 52, and the leveling system 80, and, optionally, the user interface 220. The header computing system 202 and the main computing system 203 may be communicatively coupled in any suitable way. In some embodiments, the header computing system 202 may then communicate the header position to the main computing system 203, where the main computing system 203 may subsequently control the operation of the crop processing system and/or user interface 220 based at least in part on the header. Alternatively, or additionally, the header computing system 202 may control the operation of the crop processing system and/or user interface 220 via communication with the main computing system 203. It should be appreciated that by using the header computing system 202, the data processing load on the main computing system 203 may be reduced. It should additionally be appreciated that, due to the distance between the header 32 and the main computing system 203, it is easier to couple (e.g., with wires or wirelessly) the sensor(s) 150 to the header computing system 202 and to couple (e.g., with wires or wirelessly) the computing systems 202, 203 than to couple (e.g., with wires or wirelessly) the sensor(s) 150 directly to the main computing system 203.

In one embodiment, the memory 206 of the computing system 202 may include one or more databases for storing information associated with the operation of the harvester 10, including the data 208 associated with controlling the operation of the header 32. For instance, as shown in FIG. 2, the memory 206 may include a sensor database 210 for storing data provided by the sensor(s) 150 that is associated with the contour of the field. For instance, the sensor(s) 150 may be configured to continuously or periodically capture data associated with a portion of the field, such as immediately before and/or after the performance of an agricultural operation within such portion of the field. As discussed above with reference to FIG. 1, in some instances the sensor(s) 150 are positioned on the harvester 10 and/or may be positioned on another vehicle and/or implement. The data from the sensor(s) 150 may generally be transmitted to the computing system 202 and stored within the sensor database 210 for subsequent processing and/or analysis. It should be appreciated that, as used herein, the term sensor data 210 may include any suitable type of data received from the sensor(s) 150 that allows for the contour of a field to be analyzed, as described above with reference to FIG. 1. It should be appreciated that, in several embodiments, the sensor data 210 may be geo-referenced or otherwise cross-referenced with corresponding location data generated by the positioning device(s) 222 associated with the specific location at which such data was collected within the field.

Referring still to FIG. 2, in several embodiments, the instructions 214 stored within the memory 206 of the computing system 202 may be executed by the processor(s) 204 to implement a control module 216. For instance, the control module 216 may be configured to determine the aggressiveness of the contour of the field based at least in part on the sensor data 210. For instance, as indicated above, the sensor data 210 may indicate the contour of the field, which may, in turn, be used to determine the presence of changes in the contour and how aggressive such changes are. For instance, the control module 216 may be configured to determine the aggressiveness of the contour of the field based at least in part on a derivative of a slope of the contour of the field determined from the sensor data 210, where the derivative of the slope of the contour of the field at a given position in the field is generally indicative of a rate of change of the slope at the given position. In some instances, the derivative of the slope of the contour of the field at a given location may be directly used as an aggressiveness of the contour of the field at the given location. However, in some instances, the aggressiveness of the contour of the field at a given location is calculated by squaring the derivative of the slope of the contour of the field at the given location, which gives greater weight to larger rates of change in the slope of the contour of the field.

In some instances, the sensor data 210 is filtered before being used to determine the aggressiveness of the contour of the field. For instance, the sensor data 210 may generally be filtered by the control module 216 to remove noise (e.g., outlying values). For example, the sensor data 210 may be filtered to ignore movements of the header 32, such as due actuation of the actuator(s) 72, 74. As such, data points of the sensor data 210 coinciding with movements of the header 32 by actuation of the actuator(s) 72, 74 may be ignored or adjusted to remove influence of the actuation of the actuator(s) 72, 74.

Further, in some instances, the control module 216 may be configured to decide which type of sensor data 210 to use, when both real-time data and historical data are present. For instance, the control module 216 may determine the aggressiveness of the contour of the field based at least in part on real-time data generated by the sensor(s) 150 on-board the harvester 10 during a current harvesting operation when a ground speed of the agricultural harvester is less than a threshold speed, such that the control module 216 has sufficient time to analyze and react to the contour of the field. In some instances, the control module 216 may determine the aggressiveness of the contour of the field based on historical data alone when the ground speed of the agricultural harvester is greater than the threshold speed.

After determining the aggressiveness of the contour of the field, the control module 216 may be configured to determine whether the current gain for controlling the actuator(s) 72, 74 is appropriate for the aggressiveness of the contour of the field. For instance, the aggressiveness of the contour of the field may be correlated by the control module 216 to a particular gain or gain range. For example, in some instances, the aggressiveness of the contour of the field may be used in an algorithm and/or the like (e.g., stored in the memory 206) for determining an appropriate gain or gain range for the aggressiveness. In some instances, the aggressiveness of the contour of the field may additionally, or alternatively, be compared to a look-up table and/or the like (e.g., stored in the memory 206) correlating values of aggressiveness to respective gain values or gain ranges. As an example, the control module 216 may compare the aggressiveness of the contour of the field to at least one aggressiveness threshold (e.g., a low aggressiveness threshold, a low-medium aggressiveness threshold, a medium-high aggressiveness threshold, a high aggressiveness threshold, and/or the like), where each of the at least one aggressiveness threshold is associated with a respective gain setting (e.g., gain or range of gains). In general, the higher the aggressiveness, the higher (faster) the associated gain. It should be appreciated that the gain setting (e.g., gain or range of gains) associated with a given aggressiveness value may change based on the ground speed of the agricultural harvester 10. For instance, the gain required for a given aggressiveness value is greater when the ground speed of the agricultural harvester 10 is faster than when the ground speed of the agricultural harvester 10 is slower.

In some instances, if the gain setting associated with the aggressiveness of the contour of the field is different than the current gain, the control module 216 may automatically adjust the gain from the current gain to the setting associated with the aggressiveness of the contour of the field. However, in some instances, if the gain setting associated with the aggressiveness of the contour of the field is outside of a possible gain range of the actuator(s) 72, 74 (e.g., determined based on the configuration of the actuator(s) 72, 74), the control module 216 will not automatically adjust the gain from the current gain. It should be appreciated that instead of, or in addition to, automatically adjusting the gain, the control module 216 may be configured to indicate the recommended gain setting associated with the aggressiveness of the contour of the field determined to an operator, such as by controlling an operation of the user interface(s) 220.

In addition to adjusting the gain for controlling the actuator(s) 72, 74, in some embodiments, the control module 216 may further be configured to control an operation of the actuator(s) 72, 74. For instance, the control module 216 may be configured to automatically control the operation of the actuator(s) 72, 74 to maintain the header 32 at a given position (e.g., height) from the field. For example, the control module 216 may be configured to automatically control the operation of the actuator(s) 72, 74 to maintain the header 32 at a given position (e.g., height) from the field based on the data indicative of the contour of the field. As such, the system 200 may automatically control the actuator(s) 72, 74 according to the contour of the field and with an appropriate gain for the detected aggressiveness of the contour.

Figure 3:
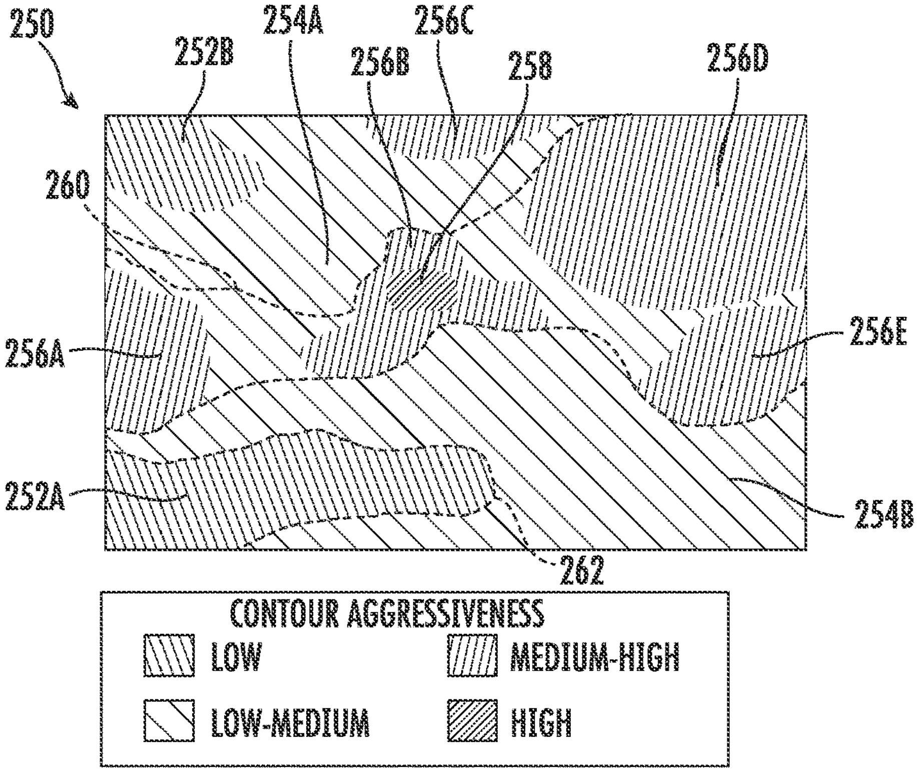
FIG. 3 illustrates an example of an aggressiveness map for adjusting gains for position control of a header of an agricultural harvester in accordance with aspects of the present subject matter.

In some embodiments, the instructions 214, when executed by the processor(s) 204, may further configure the computing system 202 to execute a map module 218. In general, the map module 218 may be configured to correlate the aggressiveness of the contour of the field and/or associated gain setting to different locations within the field. For instance, FIG. 3 illustrates an example of an aggressiveness map 250 for adjusting gains for position control of a header of an agricultural harvester which may be generated in accordance with aspects of the present subject matter. As shown in FIG. 3, the aggressiveness map 250 correlates each position in the field with a determined aggressiveness range. For instance, the aggressiveness map 250 identifies first zones 252A, 252B associated with low aggressiveness values, where the rate of change of the slope of the contour of the field is relatively small and/or gradual. Similarly, the aggressiveness map 250 identifies second zones 254A, 254B associated with low to medium ("low-medium") aggressiveness values, where the rate of change of the slope of the contour of the field in the low-medium aggressiveness range is relatively higher and/or less gradual than in the low aggressiveness range. Moreover, the aggressiveness map 250 identifies third zones 256A, 256B, 256C, 256D, 256E associated with medium to high ("medium-high") aggressiveness values, where the rate of change of the slope of the contour of the field in the medium-high aggressiveness range is relatively higher and/or less gradual than in the low-medium aggressiveness range. Additionally, the aggressiveness map 250 identifies a fourth zone 258 associated with high aggressiveness values, where the rate of change of the slope of the contour of the field in the high aggressiveness range is relatively higher and/or less gradual than in the medium-high aggressiveness range. It should be appreciated that the map may have any other suitable number of discrete aggressiveness ranges and/or may indicate the aggressiveness of the contour of the field in any other suitable manner.

The aggressiveness map 250 may be used to adjust the gain setting of the header 32 (e.g., for controlling the actuator(s) 72, 74). For instance, the low aggressiveness range may be mapped to a low gain value or range of low gain values, and the low-medium aggressiveness range may be mapped to a low-medium gain value or range of low-medium gain values, where the low-medium gain value(s) are generally higher than the low gain value(s). Similarly, the medium-high aggressiveness range may be mapped to a medium-high gain value or range of medium-high gain values, where the medium-high gain value(s) are generally higher than the low-medium gain value(s). Additionally, the high aggressiveness range may be mapped to a high gain value or range of high gain values, where the high gain value(s) are generally higher than the medium-high gain value(s).

In some instances, the control module 216 may be configured to evaluate the aggressiveness map 250 to recommend a heading of the agricultural harvester 10. For instance, the aggressiveness value at each mapped position in the field may also be associated with a direction to provide a "vector" for aggressiveness or "aggressiveness vector". If the current or planned heading of the agricultural harvester 10 at a given location in the field is parallel to the aggressiveness vector associated with the given location, the effective aggressiveness value is zero. Conversely, if the current or planned heading of the agricultural harvester 10 at a given location in the field is perpendicular to the aggressiveness vector associated with the given location, the effective aggressiveness value is the aggressiveness value of the vector associated with the given location. As such, a heading that is more parallel to the aggressiveness vectors will need lower gain than a heading that is more perpendicular to the aggressiveness vectors.

Accordingly, the control module 216 may determine features (e.g., ridges, valleys, and/or the like) in the field from the aggressiveness map 250, and determine a recommended heading based at least in part on the aggressiveness vectors across the features. For instance, the control module 216 may identify a ridge 260 extending across the medium-high aggressiveness zones 256A, 256B, 256D, 256E and the high aggressiveness zone 258 and determine if an alternate heading that is more parallel to an average of the aggressiveness vectors across the ridge 260 than a current or planned heading is available. Similarly, the control module 216 may identify a valley 256 (including the low zone 252A) next to the ridge 260 and determine if an alternate heading that is more parallel to an average of the aggressiveness vectors across the valley 256 than a current or planned heading is available. If an alternate heading is determined where an effective aggressiveness of the contour of the field associated with the alternate heading is at least a threshold amount less than the aggressiveness of the contour of the field associated with the current heading, the control module 216 may automatically adjust the heading of the agricultural harvester 10 to the alternate heading and/or may control an operation of the user interface(s) 220 to indicate the alternate heading.

It should be appreciated that the computing system 202 may also include various other suitable components, such as a communications circuit or module 224, a network interface, one or more input/output channels, a data/control bus and/or the like, to allow the computing system 202 to be communicatively coupled with any of the various other system components described herein.

Figure 4:
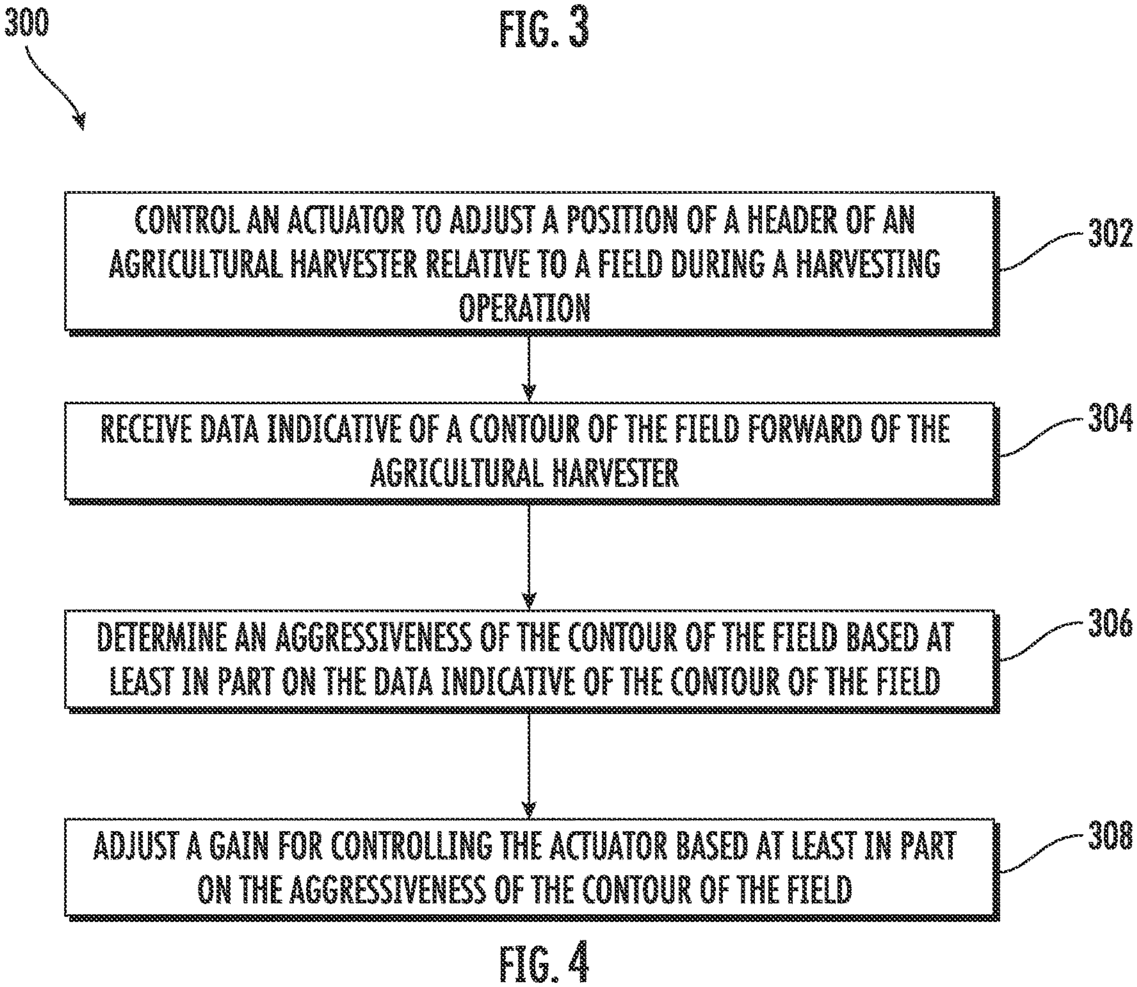
FIG. 4 illustrates a flow diagram of one embodiment of a method for adjusting gains for position control of a header of an agricultural harvester in accordance with aspects of the present subject matter.

Referring now to FIG. 4, FIG. 4 illustrates a flow diagram of one embodiment of a method 300 for adjusting gains for position control of a header of an agricultural harvester (e.g., header 32 of the agricultural harvester 10) is illustrated in accordance with aspects of the present subject matter. For purposes of discussion, the method 300 will generally be described herein with reference to the harvester 10 described with reference to FIG. 1, and the computing system 202 described with reference to FIG. 2. However, it should be appreciated that the disclosed method 300 may be used with any suitable agricultural work vehicle having any other suitable vehicle configuration and/or with a computing system having any other suitable system configuration. Additionally, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (302) the method 300 includes controlling an actuator to adjust a position of a header of an agricultural harvester relative to a field during a harvesting operation. For instance, as discussed above, the computing system 202 may be configured to control an actuator (e.g., the header actuator(s) 72, 74) to adjust a position of the header 32 of the agricultural harvester 10 relative to a field during a harvesting operation, for instance, to keep the header 32 at a certain position (e.g., height) relative to the field.

Further, at (304), the method 300 includes receiving data indicative of a contour of the field forward of the agricultural harvester. For example, as described above, the computing system 202 may receive sensor data 210 indicative of a contour of the field forward of the agricultural harvester 10 relative to a direction of travel 21 of the agricultural harvester 10.

Moreover, at (306), the method 300 includes determining an aggressiveness of the contour of the field based at least in part on the data indicative of the contour of the field. For instance, as described above, the computing system 202 may determine an aggressiveness of the contour of the field based at least in part on the sensor data 210 indicative of the contour of the field.

Additionally, at (308), the method 300 includes adjusting a gain for controlling the actuator based at least in part on the aggressiveness of the contour of the field. For example, as discussed above, the computing system 202 may adjust a gain for controlling the header actuator(s) 72, 74 based at least in part on the aggressiveness of the contour of the field.

It is to be understood that the steps of the method 300 are performed by the computing system 200 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 200 described herein, such as the method 300, is implemented in software code or instructions which are tangibly stored on a tangible computer readable medium. The computing system 200 loads the software code or instructions via a direct interface with the computer readable medium or via a wired and/or wireless network. Upon loading and executing such software code or instructions by the computing system 200, the computing system 200 may perform any of the functionality of the computing system 200 described herein, including any steps of the method 300 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system that adjusts gains in position control of a header of an agricultural harvester, the system comprising:
- a header of an agricultural harvester;
- an actuator that adjusts a position of the header relative to a field; and
- a computing system communicatively coupled to the actuator, the computing system:
  - receiving data indicative of a contour of the field forward of the agricultural harvester relative to a forward direction of travel of the agricultural harvester;
  - determining an aggressiveness of the contour of the field based at least in part on the data indicative of the contour of the field; and
  - adjusting a gain that controls the actuator based at least in part on the aggressiveness of the contour of the field.

2. The system of claim 1, wherein the computing system further compares the aggressiveness of the contour of the field to at least one threshold, each of the at least one threshold being associated with a respective gain setting; and
- wherein the adjusting the gain that controls the actuator comprises adjusting the gain to the gain setting associated with the aggressiveness of the contour of the field.

3. The system of claim 2, wherein the adjusting the gain to the gain setting associated with the aggressiveness of the contour of the field occurs when the gain setting is within a gain range of the actuator.

4. The system of claim 1, wherein the determining the aggressiveness of the contour of the field is based at least in part on a derivative of a slope of the contour of the field.

5. The system of claim 1, wherein the computing system further filters the data indicative of the contour of the field based at least in part on actuation of the header by the actuator; and
- wherein the determining the aggressiveness of the contour of the field is based at least in part on the data after being filtered.

6. The system of claim 1, wherein the determining the aggressiveness of the contour of the field is based at least in part on the data indicative of the contour of the field and a current heading of the forward direction of travel of the agricultural harvester relative to the contour of the field.

7. The system of claim 1, wherein the actuator moves the header relative to a chassis of the agricultural harvester in adjusting the position of the header relative to the field.

8. The system of claim 1, further comprising a sensor positioned on the agricultural harvester;

wherein the sensor has a field of view directed towards the field forward of the agricultural harvester;

wherein the sensor generates the data indicative of the contour of the field; and wherein the computing system receives the data indicative of the contour of the field generated by the sensor.

9. The system of claim 8, wherein the sensor comprises at least one of: a radar sensor, a LIDAR device, a camera, or an ultrasonic sensor.

10. The system of claim 1, wherein the data indicative of the contour of the field comprises historical data generated before a current harvesting operation of the agricultural harvester within the field.

11. A method of adjusting gains in position control of a header of an agricultural harvester, the method comprising:

controlling, with a computing system, an actuator that adjusts a position of the header relative to a field during a harvesting operation;

receiving, with the computing system, data indicative of a contour of the field forward of the agricultural harvester relative to a forward direction of travel of the agricultural harvester;

determining, with the computing system, an aggressiveness of the contour of the field based at least in part on the data indicative of the contour of the field and a current heading of the forward direction of travel of the agricultural harvester relative to the contour of the field;

determining, with the computing system, an alternate heading of the agricultural harvester based at least in part on the data indicative of the contour of the field, the alternate heading being different than the current heading of the forward direction of travel;

recommending, with the computing system, an adjustment of the current heading of the forward direction of travel to the alternate heading when an effective aggressiveness associated with the alternate heading is less than the aggressiveness associated with the current heading of the forward direction of travel by at least a threshold amount; and adjusting, with the computing system, a gain that controls the actuator based at least in part on the aggressiveness of the contour of the field and the recommendation.

12. The method of claim 11, further comprising:

comparing, with the computing system, the aggressiveness of the contour of the field to at least one threshold;

wherein each of the at least one threshold is associated with a respective gain setting; and wherein the adjusting the gain that controls the actuator comprises adjusting the gain to the gain setting associated with the aggressiveness of the contour of the field.

13. The method of claim 12, wherein the adjusting the gain that controls the actuator to the gain setting associated with the aggressiveness of the contour of the field comprises the adjusting the gain that controls the actuator to the gain setting associated with the aggressiveness of the contour of the field when the gain setting is within a gain range of the actuator.

14. The method of claim 11, wherein the determining the aggressiveness of the contour of the field comprises the determining the aggressiveness of the contour of the field based at least in part on a derivative of a slope of the contour of the field.

15. The method of claim 11, further comprising:

filtering, with the computing system, the data indicative of the contour of the field based at least in part on actuation of the header by the actuator;

wherein the determining the aggressiveness of the contour of the field comprises the determining the aggressiveness of the contour of the field based at least in part on the data after being filtered.

16. The method of claim 11, wherein the receiving the data indicative of the contour of the field comprises receiving data generated by a sensor positioned on the agricultural harvester; and wherein the sensor has a field of view directed towards the field forward of the agricultural harvester.

17. The method of claim 16, wherein the receiving the data generated by the sensor occurs when a ground speed of the agricultural harvester is less than a threshold speed.

18. The method of claim 11, wherein the receiving the data indicative of the contour of the field comprises receiving historical data, the historical data being generated before the harvesting operation of the agricultural harvester within the field.

* * * * *